(12) United States Patent
Urabe

(10) Patent No.: US 7,478,885 B2
(45) Date of Patent: Jan. 20, 2009

(54) CAP MEMBER FOR INTERNALLY GEARED BICYCLE HUB

(75) Inventor: Hiroyuki Urabe, Sakai (JP)

(73) Assignee: Shimano Inc., Osaka (JP)

( * ) Notice: Subject to any disclaimer, the term of this patent is extended or adjusted under 35 U.S.C. 154(b) by 411 days.

(21) Appl. No.: 11/407,108

(22) Filed: Apr. 20, 2006

(65) Prior Publication Data

US 2007/0045079 A1 Mar. 1, 2007

(30) Foreign Application Priority Data

Jul. 29, 2005 (JP) ............................. 2005-220735

(51) Int. Cl.
*B60B 7/00* (2006.01)
(52) U.S. Cl. ...................... 301/110.5; 301/59
(58) Field of Classification Search .............. 301/37.41, 301/59, 110.5, 105.6, 124.2
See application file for complete search history.

(56) References Cited

U.S. PATENT DOCUMENTS

| 1,878,528 | A | * | 9/1932 | Kraeft | 301/60 |
| 4,567,973 | A | * | 2/1986 | Butz | 192/64 |
| 5,492,392 | A | * | 2/1996 | Chen | 301/37.41 |
| 5,785,625 | A | * | 7/1998 | Matsuo et al. | 475/297 |
| 5,961,416 | A | * | 10/1999 | Shoge | 475/297 |
| 6,030,052 | A | * | 2/2000 | Watarai et al. | 301/110.5 |
| 6,322,155 | B1 | | 11/2001 | Chen | |
| 6,325,386 | B1 | * | 12/2001 | Shoge | 277/500 |
| 6,571,920 | B1 | | 6/2003 | Sturmer et al. | |
| 6,607,465 | B1 | * | 8/2003 | Shoge | 475/297 |
| 6,641,500 | B2 | * | 11/2003 | Shoge | 475/276 |
| 2002/0008422 | A1 | * | 1/2002 | Tabe | 301/110.5 |
| 2005/0067883 | A1 | * | 3/2005 | Meggiolan | 301/110.5 |

FOREIGN PATENT DOCUMENTS

| DE | 201 01 377 U1 | 5/2001 |
| EP | 1 040 993 A2 | 10/2000 |
| EP | 1 323 626 A2 | 7/2003 |
| JP | 2000-302081 | 10/2000 |
| JP | 2005231617 A * | 9/2005 |
| TW | 207691 | 6/1993 |
| TW | 367296 | 8/1999 |
| TW | 448854 U | 8/2001 |
| TW | 517023 B | 1/2003 |

* cited by examiner

*Primary Examiner*—Russell D Stormer
(74) *Attorney, Agent, or Firm*—Global IP Counselors, LLP

(57) ABSTRACT

A cap member of an internally geared hub includes a cap body and a first seal member. The cap body has a side wall part and an outer cylindrical part provided with an internally threaded section that meshes with external threads of a cylindrical member of a hub shell. The side wall part has an opening in the center thereof configured such that a driver inside the hub shell extends there-through. The side wall part is configured to extend radially inward from a first axial end section of the outer cylindrical part. A first seal member is arranged on the side wall part of the cap body and configured to contact the driver thereby creating a seal around the driver.

7 Claims, 6 Drawing Sheets

CAP MEMBER FOR INTERNALLY GEARED BICYCLE HUB

CROSS-REFERENCE TO RELATED APPLICATIONS

This application claims priority under 35 U.S.C. § 119 to Japanese Patent Application No. 2005-220735. The entire disclosure of Japanese Patent Application No. 2005-220735 is hereby incorporated herein by reference.

BACKGROUND OF THE INVENTION

1. Field of the Invention

This invention generally relates to a cap member. More specifically, the present invention relates to a cap member for an internally geared bicycle hub.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle cap member.

An internally geared bicycle hub generally includes a hub axle configured such that it can be mounted to a frame of a bicycle, a generally cylindrical driver mounted on the hub axle in such a fashion that it can rotate freely, a generally cylindrical hub shell arranged around the outside circumference of the hub axle, and a transmission mechanism having a plurality of power transmission paths and configured to transmit rotation of the driver to the hub shell through any one of the power transmission paths. A known method for preventing the penetration of moisture into the internally geared hub is to provide a moisture resistant cap member between the driver and the hub shell (e.g., Japanese Patent No. 3428559). A conventional cap member includes an annular housing and a seal member that is held by the annular housing and arranged and configured to touch against the driver. The annular housing has a cylindrical side wall and a seal connecting wall that extends radially inward from the side wall. Several of slots are formed in the side wall in such a fashion as to be arranged along a circumferential direction of the side wall. A connecting protrusion is also provided on the internal circumferential surface of the side wall, the connecting protrusion being arranged near the axially inward end of the side wall and configured to protrude slightly in the radially inward direction. The connecting protrusion is divided into sections by the slots and configured such that it can engage with a connecting groove formed in the external circumferential surface of the hub shell. With this design of cap member, the cap member is secured such that it will not fall off by the elastic engagement of the connecting protrusion with the connecting groove. When this kind of cap member is mounted on the end of a hub shell, a side portion of the hub shell is covered by the side wall and the seal connecting wall and it becomes more difficult for liquids to penetrate the gap between the hub shell and the driver because the seal member touches against the driver.

With the conventional design of cap member just described, the cap member and the hub shell are not mated closely together because the cap member is secured to the hub shell by the elastic engagement of the connecting protrusion (which is divided into sections by the slots) with the connecting groove. Consequently, there is the possibility that a gap that communicates with the outside of the hub shell will form between the hub shell and the cap member and allow liquids to penetrate to the inside of the hub. In order to prevent the penetration of liquids in hubs having such a conventional cap member, grease or other supplementary material or auxiliary member is applied or installed to the inside of the cap member to improve the moisture resistance.

In view of the above, it will be apparent to those skilled in the art from this disclosure that there exists a need for a cap member for an internally geared bicycle hub. This invention addresses this need in the art as well as other needs, which will become apparent to those skilled in the art from this disclosure.

SUMMARY OF THE INVENTION

One object of the present invention is to provide a cap member for an internally geared bicycle hub that improves the moisture resistance of the cap member without using a supplementary material or member.

An internally geared bicycle hub cap member in accordance with a first aspect of the present invention includes a cap body and a first seal member. The cap body includes an outer cylindrical part and a side wall part. The outer cylindrical part has a threaded section configured to threadedly engage a hub shell of an internally geared bicycle hub. The outer cylindrical part has a first axial end section and a second axial end section, the first axial end section extending toward an outboard end of the internally geared bicycle hub and the second axial end section extending toward an inboard area of the internally geared bicycle hub. The side wall part has a central opening configured such that a driver of the internally geared bicycle hub disposed at least partially inside the hub shell can extend there-through. The side wall part is further configured to extend radially inward from the first axial end section of the outer cylindrical part. The first seal member is arranged on the side wall part of the cap body and configured to contact the driver.

With this cap member, the screw threaded section is screwed onto or into the hub shell when the cap member is attached to the hub shell, thereby securing the cap member to the hub shell. When the cap member is installed, the first seal member contacts and forms a seal with the driver. Since the cap member is mounted to the hub shell by screwing the screw-threaded section into or onto the hub shell, the cap member and the hub shell can be mated more closely together and moisture resistance can be improved without using grease or another supplementary material or members.

An internally geared bicycle hub cap member in accordance with a second aspect of the present invention is an internally geared bicycle hub cap member according to the first aspect, wherein the side wall part of the cap body has an inner cylindrical part adjacent to the opening. The first seal member is installed on an internal circumferential surface of the inner cylindrical part.

With this cap member, an inner cylindrical part is provided in the opening through which the driver extends and the first seal member is mounted on the internal circumferential surface of the inner cylindrical part. As a result, it is easier to install a first seal member that seals around the driver.

An internally geared bicycle hub cap member in accordance with a third aspect of the present invention is an internally geared bicycle hub cap member according to the second aspect, wherein the first seal member is elastically secured to the internal circumferential surface of the inner cylindrical part. With this cap member, the first seal member can be installed easily without the use of screws or other separate members.

An internally geared bicycle hub cap member in accordance with a fourth aspect of the present invention is an internally geared bicycle hub cap member according to any one of the first to third aspects, further including a second seal member that is made of an elastic material. The second seal member is arranged at a second axial end section of the outer cylindrical part, and configured to contact and form a seal with the hub shell. With this cap member, the elastic second seal member eliminates the formation of a gap between the second axial end section and the hub shell. As a result, the cap member mates evenly and closely with respect to the hub shell and the moisture resistance can be improved further.

An internally geared bicycle hub cap member in accordance with a fifth aspect of the present invention is an internally geared bicycle hub cap member according to the fourth aspect, wherein the second seal member is installed in an annular recess formed in the second axial end of the outer cylindrical part. Further, the second seal member has a tip end that protrudes farther inward in the axial direction than the second axial end section. With this cap member, the tip end of the second seal member reliably contacts the hub shell because it protrudes beyond the second axial end section of the outer cylindrical part. As a result, the moisture resistance is improved even further.

An internally geared bicycle hub cap member in accordance with a sixth aspect of the present invention is an internally geared bicycle hub cap member according to any one of the first to fifth aspects, wherein the cap body is made of a synthetic resin material. With this cap member, the increase in the weight of the internally geared hub resulting from the existence of the cap member can be curbed.

An internally geared bicycle hub in accordance with a seventh aspect of the present invention includes a hub axle, a generally cylindrical driver, a generally cylindrical hub shell, a transmission mechanism and a cap member. The hub axle is configured for attachment to a frame of a bicycle. The driver is freely rotatably mounted on the hub axle. The hub shell is disposed around an outer circumference of the hub axle. The transmission mechanism is configured with a plurality of power transmission paths for transmitting rotation of the driver to the hub shell through a selected one of the power transmission paths. The cap member is detachably mounted to at least one end of the hub shell. The cap member includes a cap body and a side wall part. The cap body includes an outer cylindrical part having a threaded section configured to threadedly engage a hub shell of an internally geared bicycle hub. The outer cylindrical part also has a first axial end section and a second axial end section. The first axial end section extends toward an outboard end of the hub shell and the second axial end section extends toward an inboard area of the hub shell. The side wall part has a central opening configured such that a portion of the driver extends there-through. The side wall part is configured to extend radially inward from the first axial end section of the outer cylindrical part. A first seal member is arranged on the side wall part of the cap body and configured to contact the driver and create a seal around the driver.

With this internally geared hub, the cap member makes it possible to obtain an internally geared hub having improved moisture resistance without using a supplementary material or member.

An internally geared bicycle hub in accordance with an eighth aspect of the present invention is an internally geared bicycle hub in accordance with the seventh aspect, wherein the hub shell has an externally threaded section on an external circumferential surface thereof. As well, the threaded section is an internally threaded section formed on an internal circumferential surface of the outer cylindrical part and configured to mesh with the externally threaded section of the hub shell.

With this hub, the cap member is mounted to the external circumference of the hub shell and an end of the hub shell is covered with the cap member. As a result, it is difficult for liquids to penetrate the inside of the hub shell and the moisture resistance of the hub is further improved.

With the present invention, since the cap member is mounted to the hub shell by screwing a threaded part onto or into the hub shell, the hub shell and the cap member can be mated more closely together and the moisture resistance can be improved without using a supplementary member or material.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
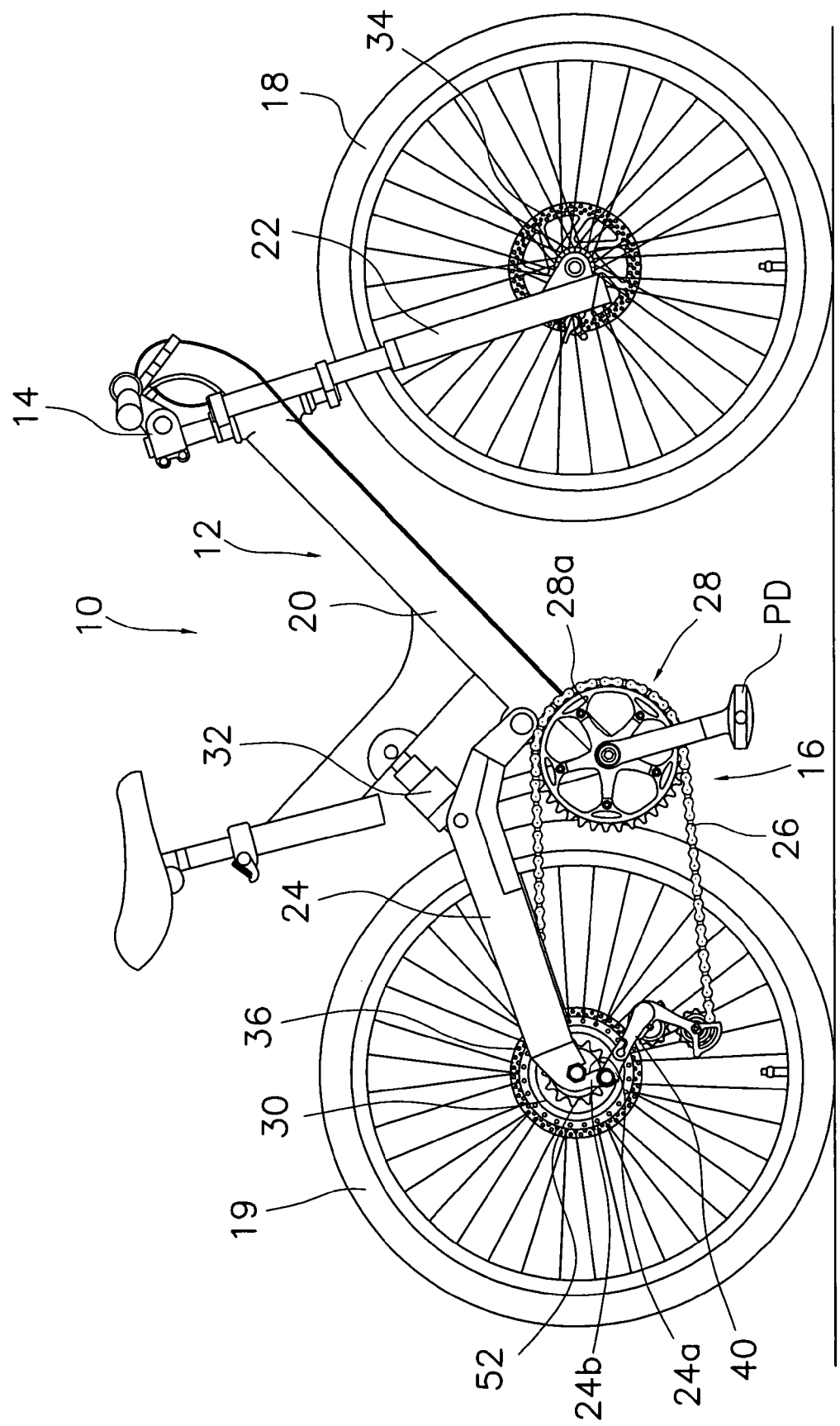
FIG. 1 is a side elevational view of a bicycle in which an embodiment of the present invention has been employed.

Referring initially to FIG. 1, a bicycle 10 is illustrated in accordance with a first embodiment of the present invention. The bicycle 10 basically includes a frameset 12, a handlebar unit 14, a drive unit 16, a front wheel 18 and a rear wheel 19.

The frameset 12 has a frame 20, a suspension fork 22, and a rear swing arm 24. The handlebar unit 14 is fastened to the suspension fork 22. The drive unit 16 includes a crankset 28 having a chain 26, pedals PD, and one front sprocket 28a mounted thereto, an internally geared hub 30, and other components. The front wheel 18 is mounted to the suspension fork 22. The rear wheel 19 is mounted to the rear swing arm 24. The suspension fork 22 is mounted to a frontward portion of the frame 20 such that it can rotate freely about an axis that is inclined somewhat from a vertical direction. The rear swing arm 24 has a rear suspension 32 and is mounted to a rearward portion of the frame 20 in such a fashion that it can pivot freely. A rearward end of the rear swing arm 24 includes a downwardly open claw-shaped rear fork end 24a for mounting the rear wheel 19 and a hanger tab 24b that extends downward from a lower portion of one leg of the rear fork end 24a.

As shown in FIG. 1, a front disk brake device 34 is mounted to the front wheel 18 and a rear disk brake device 36 is mounted to the rear wheel 19. The internally geared hub 30 is mounted to the rear wheel 19. A chain tensioner 40 is configured to apply tension to the chain 26. The chain tensioner 40 is mounted to the hanger tab 24b of the rear fork end 24a of the rear swing arm 24.

Figure 2:
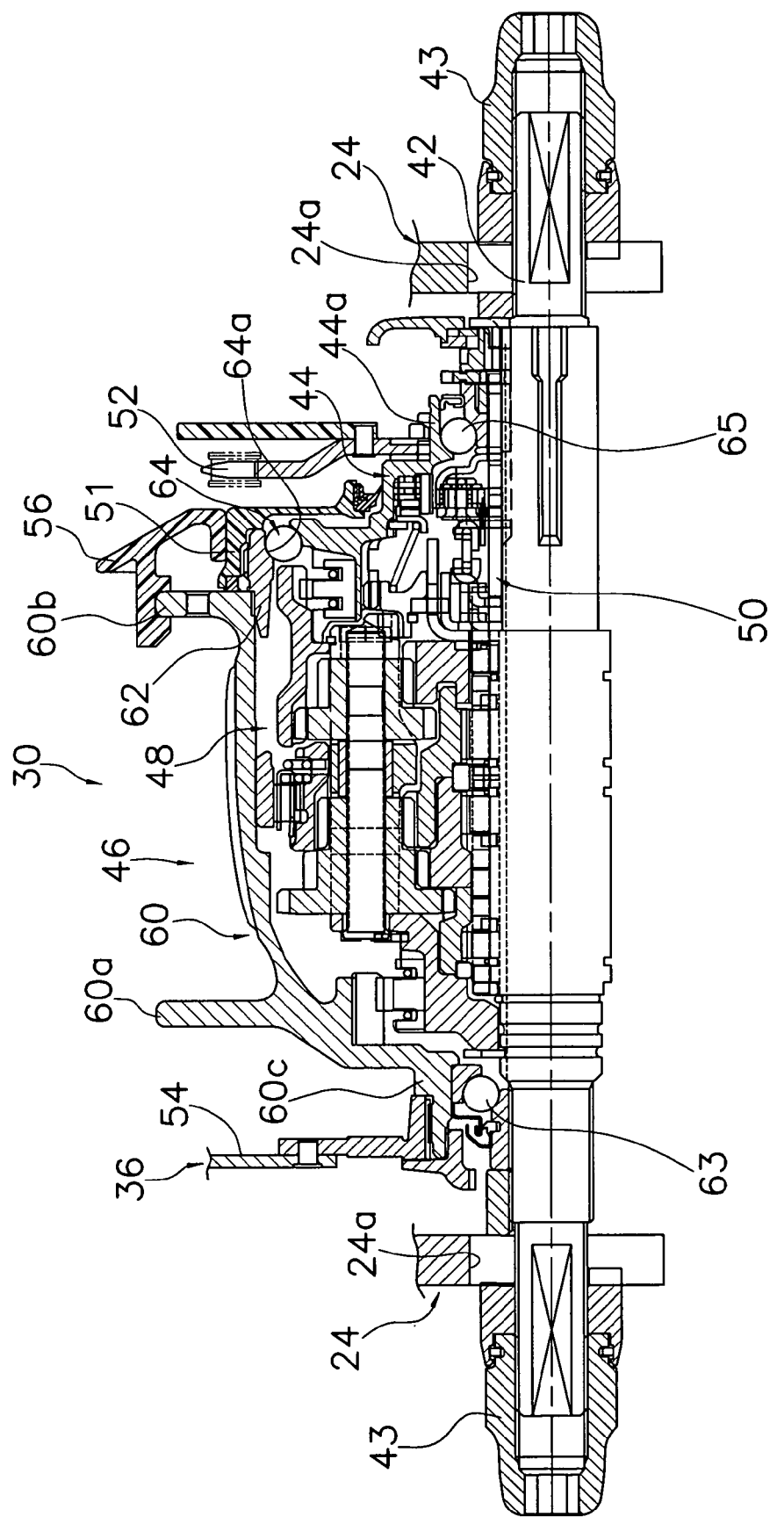
FIG. 2 is a cross sectional view of an internally geared hub in accordance with the present invention.

As shown in FIG. 2, the internally geared hub 30 basically includes a hub axle 42 of the rear wheel 19, a generally cylindrical driver 44, a generally cylindrical hub shell 46, a transmission mechanism 48, a gear changing mechanism 50 and a cap member 51. The hub axle 42 is configured to fasten to the rear fork ends 24a of the rear swing arm 24. The driver 44 is mounted on the hub axle 42 in such a fashion that it can rotate freely. The hub shell 46 is arranged around the outside circumference of the hub axle 42. The transmission mechanism 48 includes a planetary gear mechanism configured to transmit forward rotation of the driver 44 through a plurality of power transmission paths. The gear changing mechanism 50 is configured to select one of the power transmission paths. The cap member 51 is installed on an end of the hub shell 46 in accordance with one embodiment of the present invention.

The internally geared hub 30 serves as a rear gear ratio changing device and has, for example, eight speeds, i.e., eight power transmission paths or gear ratio paths. Thus, the internally geared hub 30 can transmit the rotation of the crankset 28 (shown in FIG. 1) to the hub shell 46 using any one of eight different speeds (gear ratios). A rear disk rotor 54 of the rear disk break device 36 is mounted at a location near one end of the hub shell 46, as shown toward a left side of the internally geared hub 30 in FIG. 2. A hub cover 56 is mounted to the external circumferential surface of the cap member 51.

The hub axle 42 is non-rotatably fastened to the rear fork ends 24a with fastening nuts 43 that are screwed onto respective opposite ends of the hub axle 42, as indicated in FIG. 2. The driver 44 has a smaller diameter boss section 44a on one end thereof (shown toward the right side of FIG. 2) and the driver 44 is supported rotatably on the hub axle 42 by means of a bearing 65 installed in the boss section 44a. The rear sprocket 52 is attached non-rotatably to the driver 44. The hub shell 46 includes a shell body 60 having a left-right pair of hub flanges 60a, 60b and a cylindrical member 62 that is non-rotatably connected to an internal circumferential surface of one end of the shell body 60 (shown toward the right side of FIG. 2). The shell body 60 has a smaller diameter boss section 60c seen to the left of the hub flange 60a in FIG. 2. The shell body 60 is rotatably supported on the hub axle 42 by means of a bearing 63 installed within the boss section 60c. The disk rotor 54 is non-rotatably fastened to the boss section 60c.

Figure 3:
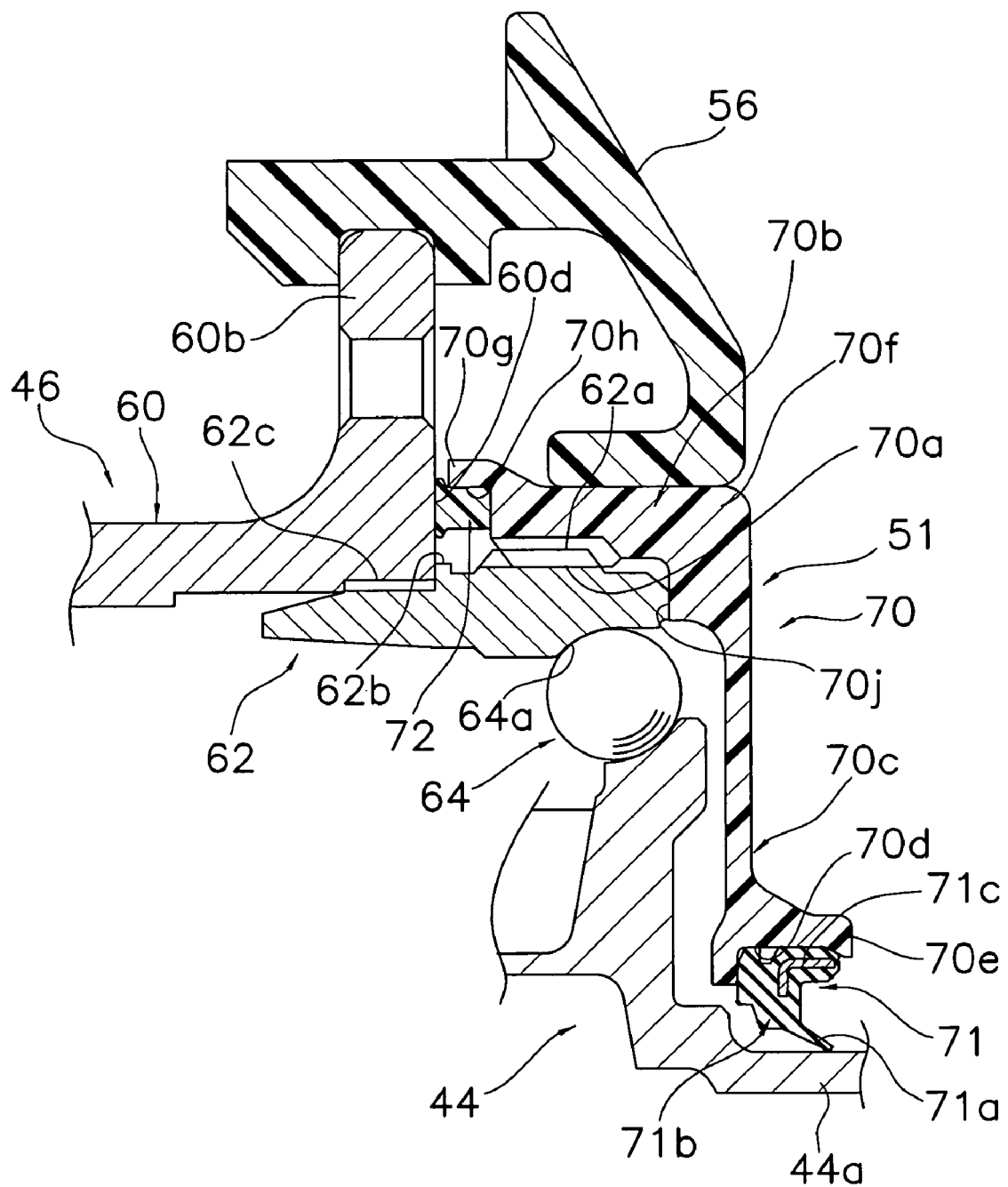
FIG. 3 is a partial cross sectional view of the internally geared hub showing the portion where the cap member is installed.

As shown in FIG. 3, a ball bearing surface 64a is formed on the internal circumference of the cylindrical member 62 thereby forming a portion of a bearing 64 for supporting one end of the hub shell 46 in a freely rotatable fashion on the driver 44. The cylindrical member 62 includes an externally threaded section 62a, an annular protrusion 62b and serrations 62c. The externally threaded section 62a is formed at a radially outward portion of the cylindrical member 62 on an external circumference of the cylindrical member 62. The annular protrusion 62b and the serrations 62c are also formed on the external circumference of the cylindrical member 62 but are arranged axially inward relative to the externally threaded section 62a. The cap member 51 is threaded or screwed onto the externally threaded section 62a and thereby fastened in place. One end of the shell body 60 contacts and presses against the annular protrusion 62b, thereby positioning the shell body 60 and the cylindrical member 62 relative to each other. The serrations 62c serve to fasten the cylindrical member 62 to the internal circumferential surface of the one end of the shell body 60. The serrations 62c can provide a forced or pressed fit with the shell body 60 or can be splines that firmly engage like splines formed in the shell body 60.

Figure 5:
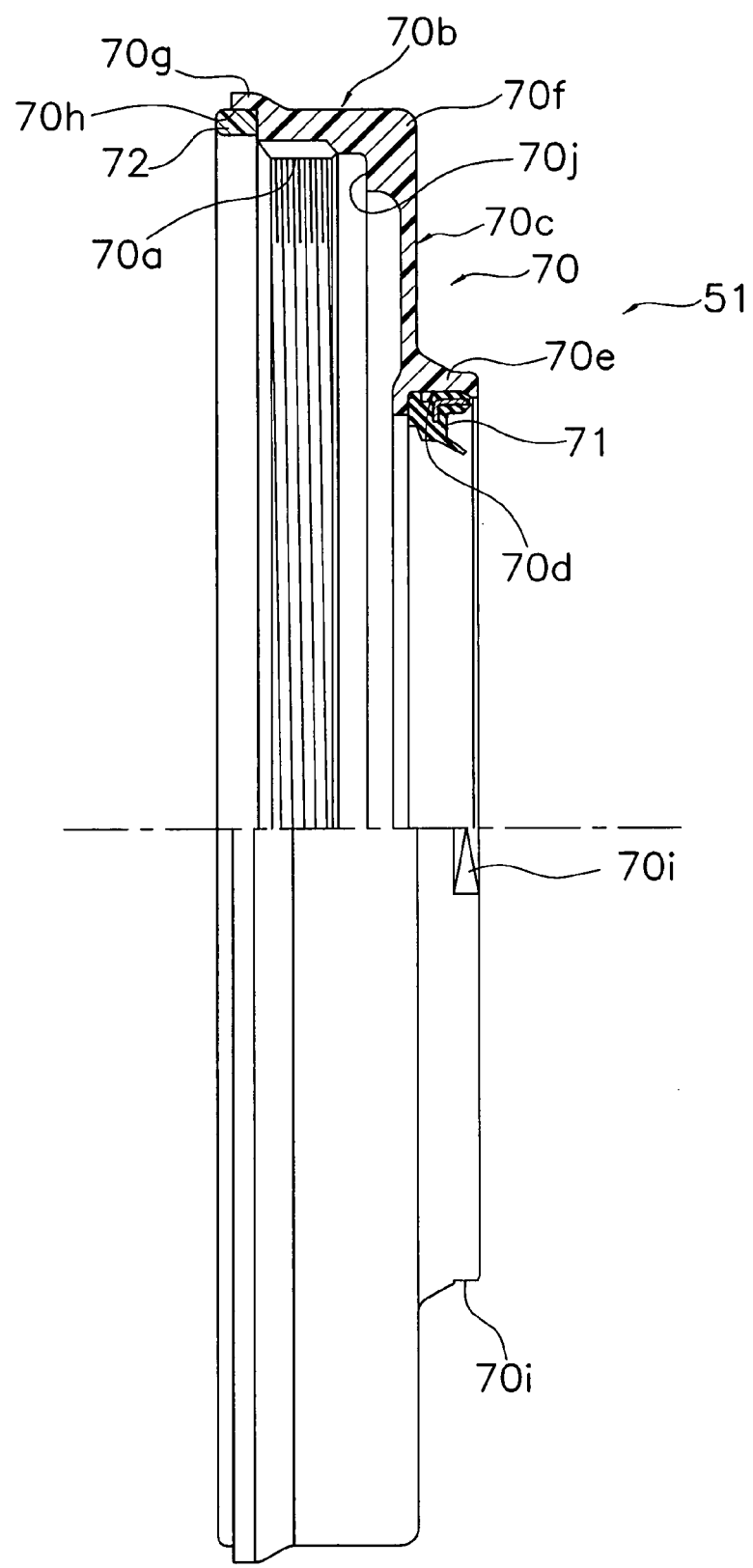
FIG. 5 is a half-cross-sectional view of the cap member, the cross sectional portion corresponding to the section line V-V shown in FIG. 4.

As shown in FIGS. 3 and 5, the cap member 51 in accordance with the first embodiment of the present invention basically includes a cap body 70, a first seal member 71 and a second seal member 72. The cap body 70 has an internally threaded section 70a. The first seal member 71 is arranged on the cap body 70 and configured to contact and press against the external circumferential surface of the boss section 44a of the driver 44. The internally threaded section 70a preferably includes parallel machine threads (straight threads) that are configured to engage and mesh with the externally threaded section 62a of the cylindrical member 62 of the hub shell 46. The second seal member 72 of the cap member 51 is configured and arranged to contact and press against the end face 60d of the shell body 60 of the hub shell 46.

Figure 4:
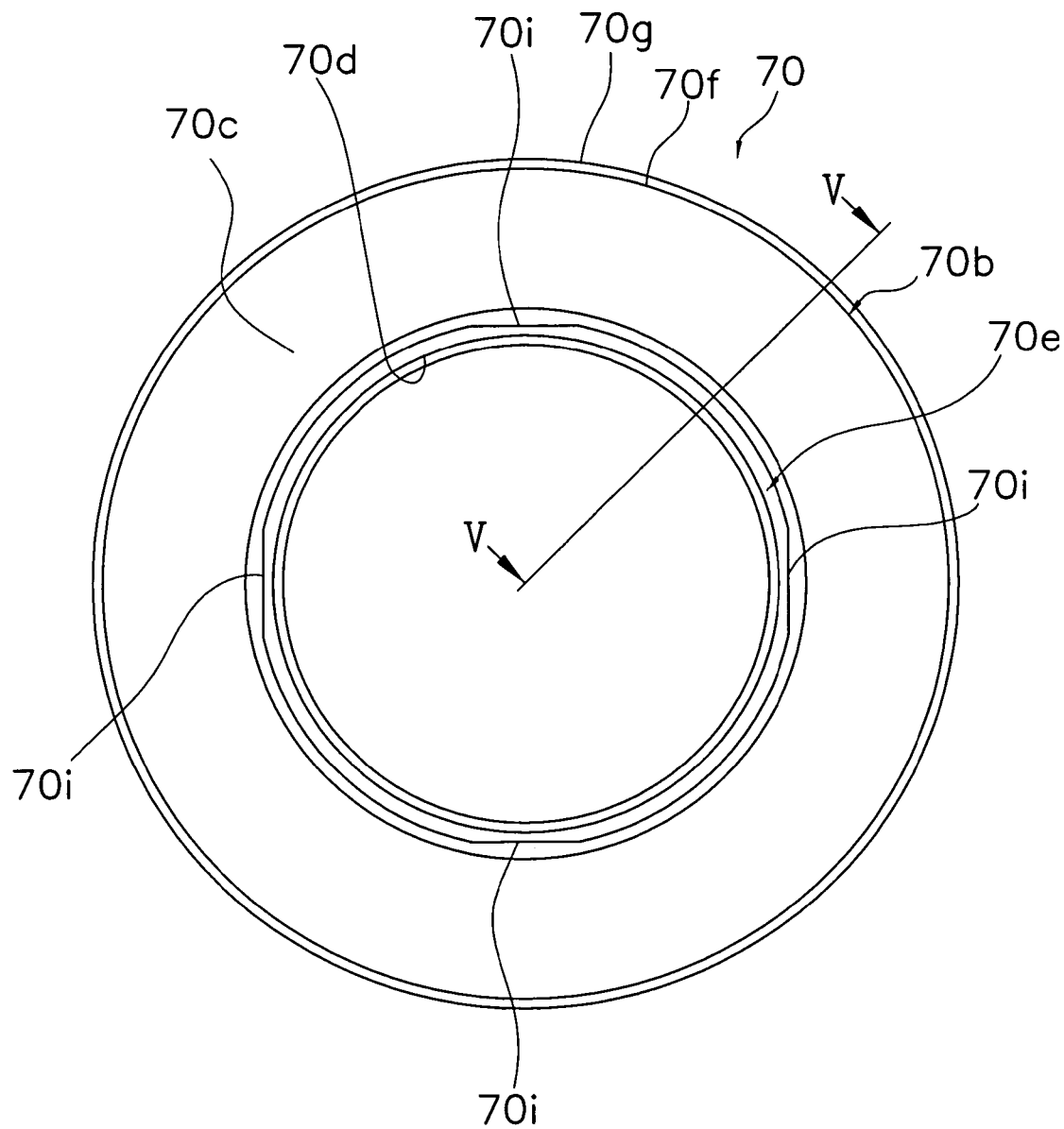
FIG. 4 is a front elevational view of the cap body of the cap member.

The cap body 70 is preferably made of an elastic synthetic resin material that is comparatively soft, such as polypropylene (PP). As shown in FIGS. 3, 4 and 5, the cap body 70 basically includes an outer cylindrical part 70b, a side wall part 70c and an opening 70d. The outer cylindrical part 70b includes a first axial end section 70f and a second axial end section 70g. Further, the internally threaded section 70a are formed on an internal circumferential surface of the outer cylindrical part 70b between the first axial end section 70f and second axial end section 70g. The side wall part 70c surrounds and includes the opening 70d. The opening 70d is located in the center of the side wall part 70c and is configured such that the driver 44 within the hub shell 46 can extend there-through. The side wall part 70c is configured to extend radially inward from the first axial end section 70f of the outer cylindrical part 70b. The first axial end section 70f is of the outer cylindrical part 70b extends outward in the axial direction relative to the shell body 60. It should be noted that in FIG. 4 the cap body 70 is shown with the first seal member 71 omitted for greater clarity.

As shown in FIG. 5, the second axial end section 70g is located further inward in the axial direction from the first axial end section 70f relative to the shell body 60. More specifically, the second axial end section 70g is an inboard end of the outer cylindrical part 70b and the first axial end section 70f is an outboard end of the outer cylindrical part 70b. The second axial end section 70g of outer cylindrical part 70b has a slightly larger diameter or dimension in the radial direction than the rest of the outer cylindrical part 70b. As also shown in FIG. 5, an inner circumferential surface of the second axial end section 70g includes an annular recess 70h. The second seal member 72 is installed in the annular recess 70h.

The side wall part 70c is shaped and configured to cover the outside surface of the driver 44. The side wall part 70c has an inner cylindrical part 70e that surrounds and formed the opening 70d. The inner cylindrical part 70e is also configured to receive and support the first seal member 71, which is installed on an inner circumferential surface of the inner cylindrical part 70e. The side wall part 70c is formed with a radially outer portion and a radially inner portion. The radially outer portion has a thickness that is greater than the thickness of the radially inner portion. The radially outer portion of the side wall part 70c has a contact surface 70j formed thereon. The contact surface 70j is configured to contact or touch the axially outward facing end face of the cylindrical member 62 when the cap member 51 is mounted to the cylindrical member 62, as indicated in FIG. 3.

The inner cylindrical part 70e is configured such that it protrudes axially outward from the side wall part 70c. As best shown in FIGS. 4 and 5, two pairs of tool engagement parts 70i are formed on an external circumferential surface of the inner cylindrical part 70e enable tightening and loosening of the cap member with a tool (not shown) during installation or removal onto the externally threaded section 62a of the cylindrical member 62. Each pair of tool engagement parts 70i includes two chamfered sections arranged parallel to each other and configured such that a tool can engage therewith.

The first seal member 71 is provided in order to seal the gap between the cap member 51 and the driver 44. The first seal member 71 basically includes a lip section 71a, a seal body 71b and a flange-shaped metal back up member 71c. The lip section 71a has a tapered tip and presses against the boss section 44a of the driver 44. The seal body 71b is made of an elastic material (preferably a synthetic rubber). The flange-shaped metal back up member 71c is embedded inside the seal body 71b. The first seal member 71 is installed such that it is elastically secured to the internal circumferential surface of the inner cylindrical part 70e. Specifically, the first seal member 71 is a flexible member that can undergo elastic deformation when fitted or installed in the cap member 51. The first seal member 71 is therefore elastically secured in place.

The second seal member 72 is provided in order to seal the gap between the cap member 51 and the hub shell 46. The second seal member 72 is an annular member having a generally rectangular cross sectional shape and made of an elastic material, preferably an olefin (a thermo plastic olefin or TPO) or other material that can be easily fused to the cap body 70. The second seal member 72 is fused (fuse welded) to the annular recess 70h. The tip end of the second seal member 72 protrudes axially inward beyond the second axial end section 70g of the outer cylindrical part 70b. The tip end of the second seal member 72 contacts the hub shell securely and improves the moisture resistance of the hub 30.

The cap member 51 is configured to be installed on the hub shell 46 after the assembly of internally geared hub 30 is completed and before the rear sprocket 52 is attached. During installation of the cap member 51 on the hub shell 46, the cap member 51 is first rotated by hand to screw the internally threaded section 70a onto the externally threaded section 62a of the cylindrical member 62 of the hub shell 46. Next, a spanner (wrench) or other appropriate tool is engaged with the tool engagement parts 70i and the cap member 51 is tightened with the tool until the contact surface 70j of the side wall part 70c touches against the axially outward facing end face of the cylindrical member 62, thereby fastening the cap member 51. Once the cap member 51 has been fastened in this fashion, the first seal member 71 presses the external circumferential surface of the boss section 44a of the driver 44 and the second seal member 72 presses against the end face 60d of the shell body 60 of the hub shell 46 in such a fashion that the tip of the second seal member 72 is slightly compressed (bulges). Since the cap member 51 is mounted to the cylindrical member 62 of the hub shell 46 by screwing the internally threaded section 70a onto the externally threaded section 62a, the cap member 51 and the hub shell 46 can be mated more closely together and the moisture resistance can be improved without using grease or some other supplementary material or member.

The second seal member 72 is arranged on the second axial end section 70g of the outer cylindrical part 70b and serves to seal the gap between the cap member 51 and the hub shell 46, thus also contributing to improving the moisture resistance.

Second Embodiment

Figure 6:
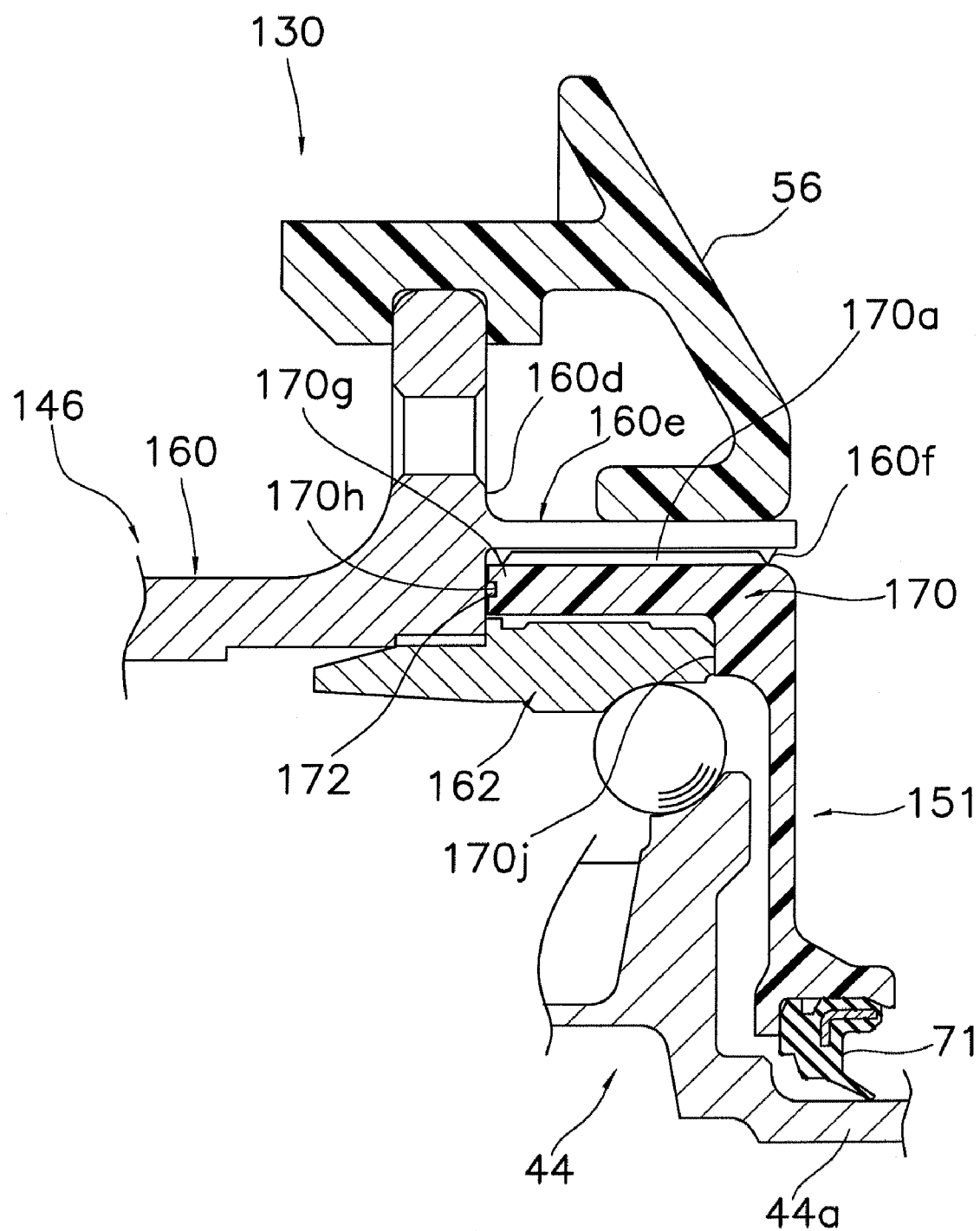
FIG. 6 is a partial cross sectional view corresponding to FIG. 3 showing another embodiment.

Referring now to FIG. 6, an internally geared hub 130 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the above described first embodiment, the cap member 51 is provided with an internally threaded section 70a and the cylindrical member 62 of the hub shell 46 of the internally geared hub 30 is provided with an externally threaded section 62a. However, the present invention is not limited to such a configuration.

As shown in FIG. 6, a shell body 160 of a hub shell 146 of the internally geared hub 130 can include a cylindrical section 160e that extends from an end face 160d of the shell body 160. The cylindrical section 160e includes internally threaded section 162f.

Further, a cap member 151 can include a cap body 170, the first seal member 71 and a second seal member 172. The cap body 170 has an externally threaded section 170a and an end section 170g. The externally threaded section 170a preferably includes parallel machine threads (straight threads) that are configured to engage and mesh with the internally threaded section 160f of the shell body 160. Consequently, the cap member 151 can be threaded or screwed to the internally threaded section 160f of the cylindrical section 160e of the shell body 160 of a hub shell 146.

The end section 170g includes an end face formed with an annular seal mounting groove 170h. The second seal member 172 is installed in the annular seal mounting groove 170h. The second seal member 172 is configured to contact and create a seal with an end face 160d of the shell body 160. In the configuration shown in FIG. 6, an O-ring is used for the second seal member 172. Other portions of the cap member 151, the shell body 160 of a hub shell 146 and the internally geared hub 130 are generally the same as the cap member 51, the shell body 60 of a hub shell 46 and the internally geared hub 30 of the first embodiment, and explanations thereof are omitted for the sake of brevity.

In a manner similar to the first embodiment, the cap member 151 is mounted to the hub shell 146 with a threaded connection and tightened until a contact surface 170j of the side wall part 170c presses against the axially outward facing end face of a cylindrical member 162. More specifically, the externally threaded section 170a is screwed into the internally threaded section 160f and the cap member 151 is tightened to fasten it to the hub shell 146. The hub cover 56 can also be installed on the external circumferential surface of the threaded cylindrical section 160e.

Other Embodiments (A) In the first embodiment, the inner cylindrical part 70e is provided on the side wall part 70c of the cap member 51. However, a first seal member like the first seal member 71 can alternatively be installed to an inner circumferential portion of the side wall part 70c with the axially protruding inner cylindrical part 70e being eliminated.

(B) In the first embodiment, moisture resistance is improved by providing the second seal member 72 at the second axial end section 70g of outer cylindrical part 70. However, in an alterative embodiment, the second seal member 72 can be omitted. When the second seal member 72 is omitted, the sealing performance can be improved by replacing the parallel machine type threads of the internally threaded section 70a with tapered threads of the type used with pipes.

(C) Although the first embodiment does not use grease or another supplementary material or member in the portion where the cap member 51 is mounted to the hub shell 46, it is acceptable to use grease or another supplementary material or member as required. For example, grease or another supplementary material can be used to prevent lock up between the cap member 51 and the hub shell 46 when the cap member 51 and the hub shell 46 are both made of a stainless steel alloy or other metal material.

(D) It should be understood from the description herein that the internally threaded section 70a of the cap member 51 and the internally threaded section 62a of the cylindrical member 62 can be formed with mating left-handed threads or with mating right-handed threads. By using the appropriately oriented threads, the cap member 51 can be prevented from coming loose due to friction when the hub shell 46 rotates freely without the driver 44 rotating. More specifically, even if the friction between the lip 71a of the first seal member 71 and the driver 44 urges the cap member 51 to rotate relative to the hub shell 46 (cylindrical member 62) in the direction corresponding to the thread direction, the screw connection will not loosen.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A cap member for an internally geared bicycle hub comprising:
   a cap body including
      an outer cylindrical part having a threaded section configured to threadedly engage a hub shell of the internally geared bicycle hub, the outer cylindrical part having a first axial end section and a second axial end section, the first axial end section extending toward an outboard end of the internally geared bicycle hub and the second axial end section extending toward an inboard area of the internally geared bicycle hub, and
      a side wall part having a central opening configured such that a driver of the internally geared bicycle hub disposed at least partially inside the hub shell can extend therethrough, the side wall part being configured to extend radially inward from the first axial end section of the outer cylindrical part;
   a first seal member arranged on the side wall part of the cap body and configured to contact the driver, the side wall part including an inner cylindrical part adjacent to the opening, and the first seal member being installed on an internal circumferential surface of the inner cylindrical part, the first seal member being elastically secured to the internal circumferential surface of the inner cylindrical part; and
   a second seal member made of an elastic material, arranged at the second axial end section of the outer cylindrical part, the second seal member configured to contact the hub shell, the second seal member is being installed in an annular recess formed at the second axial end section of the outer cylindrical part, such that the second seal member protrudes axially further than the second axial end section away from the first axial end section.

2. The cap member recited in claim 1, wherein the cap body is made of a synthetic resin material.

3. The cap member recited in claim 1, further comprising a second seal member made of an elastic material, arranged at the second axial end section of the outer cylindrical part, the second seal member configured to contact the hub shell.

4. The cap member recited in claim 3, wherein the cap body is made of a synthetic resin material.

5. The cap member recited in claim 3, wherein the second seal member is installed in an annular recess formed at the second axial end section of the outer cylindrical part, the second axial end section configured such that a tip end thereof protrudes farther axially inward than the first axial end section.

6. An internally geared bicycle hub comprising:
   a hub axle;
   a generally cylindrical driver freely rotatably mounted on the hub axle;
   a generally cylindrical hub shell disposed around an outer circumference of the hub axle;

a transmission mechanism configured with a plurality of power transmission paths for transmitting rotation of the driver to the hub shell through a selected one of the power transmission paths; and a cap member detachably mounted to at least one end of the hub shell, the cap member including a cap body, a first sealing member and a second sealing member, the cap body including an outer cylindrical part having a threaded section configured to threadedly engage a hub shell of an internally geared bicycle hub, the outer cylindrical part having a first axial end section and a second axial end section, the first axial end section extending toward an outboard end of the hub shell and the second axial end section extending toward an inboard area of the hub shell, and a side wall part that has a central opening configured such that a portion of the driver extends there-through, the side wall part being configured to extend radially inward from the first axial end section of the outer cylindrical part, the first seal member arranged on the side wall part of the cap body and configured to contact the driver, the second seal member made of an elastic material, arranged at the second axial end section of the outer cylindrical part, the second seal member contacting the hub shell, the second seal member being installed in an annular recess formed at the second axial end section of the outer cylindrical part, such that the second seal member protrudes axially further than the second axial end section away from the first axial end section.

7. The internally geared bicycle hub recited in claim 6, wherein the cap body is made of a synthetic resin material.

* * * * *